P. E. Falcon.
Raising Sunken Vessels.
N° 37,438. Patented Jan. 20, 1863.

Witnesses
F. P. Hale Jr
Geo. W. Fuller.

Inventor.
Peter E. Falcon.

UNITED STATES PATENT OFFICE.

PETER E. FALCON, OF COHASSET, MASSACHUSETTS.

IMPROVED MODE OF RAISING SUNKEN VESSELS.

Specification forming part of Letters Patent No. 37,488, dated January 20, 1863.

*To all whom it may concern:*

Be it known that I, PETER E. FALCON, a citizen of the United States of America, and a resident of Cohasset, in the county of Norfolk and State of Massachusetts, have invented a new and useful Improvement in Raising Sunken Vessels by Means of Casks or their Equivalents; and I do hereby declare the same to be fully described in the following specification and illustrated in the accompanying drawings, of which—

Figure 1:
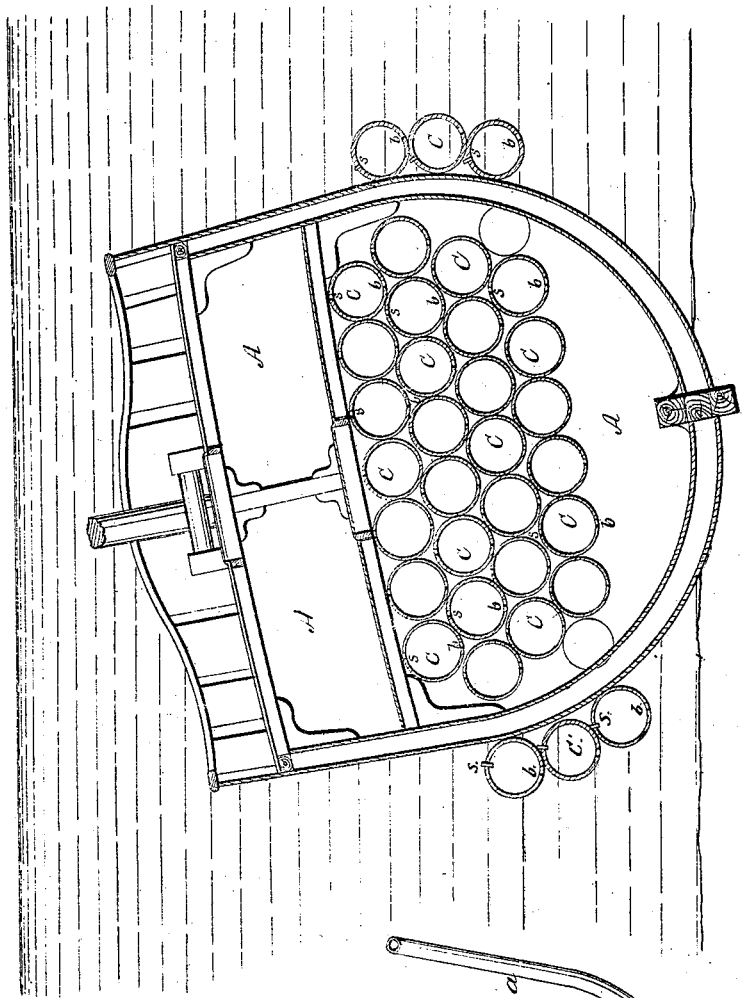
Figure 2:
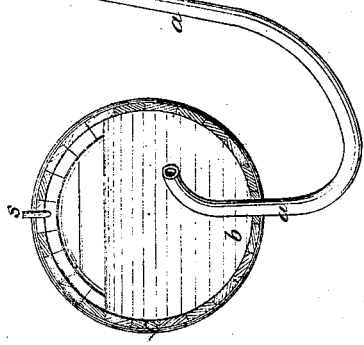

Figure 1 exhibits a transverse section of a ship in the act of being prepared for being raised by my invention. Fig. 2 is a section of a cask, and exhibits the process of supplying it with air and excluding water from it.

I am aware that for the purpose of floating a sunken vessel or structure it has been customary to place either within it or attach to it externally a series of water-casks or vessels containing air; that preparatory to each of them being put in place it has been stopped or sealed at its bung-hole so as to prevent the admission of water; the arrangement and application of such a series of casks, with respect to a sunken or stranded vessel, generally having been made at low tide, in order that during the rise of the tide the action of the water on the several casks might effect the flotation of the ship.

My process of procedure differs essentially from the above, and has been employed by me with great success and important economic results so far as time and labor are concerned. One great advantage it possesses over the old plan of operating is that it may be carried on at all times of the tide, and is not necessarily confined to the seasons or times of low water, nor in many instances to any rise or fall of tide, and, furthermore, it may be carred on in any depth of water to which a submarine diver may penetrate.

In carrying out my invention I charge each cask with water. This may be done either by passing water into its bung-hole; or in case the cask is provided with a spigot and spigot-hole arranged in its side opposite to that which contains the bung-hole, such cask should be so placed in the water that the bung-hole may be downward and the spigot be directly over it. On withdrawing the spigot from its hole the water will rush into the bung-hole and rise in the cask and expel the air, which will escape through the spigot-hole. When the cask may have become filled with water, the spigot should be driven into its hole so as to effectually close the same. After each cask may have thus been charged with water it is to be stowed in the hold or affixed to the outer surface of the ship, as circumstances may require. The arrangement of the casks within the hold of the ship or over or about her sides may be accomplished by submarine divers, who may easily dispose them in tiers or otherwise, as circumstances may require. The arrangement of each of the casks should be such that its bung-hole may be downward or in the lowest position in the cask and be open. Next, the eduction-tube of an air-pump is to be inserted into the said bung-hole and the pump set to work so as to force air into the cask and produce a displacement of the water therein, such water being driven out of the bung-hole, which should be somewhat larger in diameter than that of the entering-pipe. After a sufficient number of casks have thus been filled with water, applied to the ship, and subsequently had their water expelled by air-forced into them, their united buoyant powers will raise and float the ship in the water and enable her to remain afloat as long as such may be necessary.

In Fig. 1 of the drawings, A denotes the ship as submerged in water. C C C are the water-casks, each being arranged with its bung-hole on the lower part of the cask.

In Fig. 2, C is a cask, *a* its air-pump tube, *s* the spigot, and *b* the bung-hole.

My process enables weak casks to be employed, because, while being used they are subjected to pressure both inwardly and outwardly; the air while being forced into each, in order to displace its water, becomes condensed and exerts a pressure on the internal surface of the cask, and this aerial pressure tends to counteract the pressure of the water on the external surface of the cask.

I am aware of the invention of John R. Cambell and Increase S. Withington, as patented on the 26th day of November, A. D. 1835. My invention differs therefrom in one or more very important particulars, which render it of great practical value, in fact, far preferable to that of the said Cambell and Withington. The air, supply pipe of each of their boats or casks, as the case may be, passes down through the upper part of the vessel and has two valves upon it, whereas in the arrangement of the air-induction pipe in my invention it is caused to enter the bung-hole of the cask and the water is expelled from the bung-hole and around the air-pipe. This not only dispenses with the valves used by Cambell and Withington, but enables one induction-pipe to be used for any number of casks, whereas in Cambell and Withington's plan there is one to each cask or vessel. With Cambell and Withington's arrangement of an air pipe to each cask it would be very inconvenient, if not impossible, to discharge the air from the casks when stored in tiers in a vessel's hold, for the diver would find it nearly, if not entirely, impossible to get between the casks, either to attach the air conduit or pipe to the pipe of each cask or detach the two, as circumstances might require. With my invention, however, the air-pump pipe has only to be pushed upward into the bung-hole of each cask, the water in the cask being expelled through the said bung-hole and around the pipe, which should be of a diameter less than that of the said bung-hole.

In the process of arranging the tiers of casks and expelling water from them, those of the upper tier are first to be placed within the hold of the vessel, their buoyancy causing them to rise up against the deck. The diver next should apply the air-pipe to each cask so as to charge such cask with air and expel its water. After this he is to proceed and arrange underneath the first tier of casks another or the second tier. Having accomplished this, he is next to insert the air pipe into the bung-hole of each cask of such second tier and charge such cask with air, the bung-hole being supposed to be at the lowest part of the cask. In this way he is to proceed to lay each tier of casks in succession underneath the one last laid, and after having laid each tier he is to fill its casks with air before proceeding to lay another or the next tier. Nor do I claim the invention or inventions described in the said patent of the said Cambell and Withington.

What I do claim as my invention is—

My improved process of raising sunken vessels by means of casks or contrivances of like character, the same consisting in arranging the said casks filled with water on or within a vessel, and with their bung-holes downward, as set forth, introducing an air-conduit into the bung holes of the casks successively, and forcing air through such pipe and into each cask and expelling the water of such cask out of the bung-hole, and with respect to the said air-pipe, substantially as specified.

PETER E. FALCON.

Witnesses:
J. P. HALE, Jr.,
GEO. W. FULLER.